United States Patent [19]

Kawabata

[11] Patent Number: 4,613,225

[45] Date of Patent: Sep. 23, 1986

[54] AUTOMATIC FOCUSING DEVICE

[75] Inventor: Takashi Kawabata, Kanagawa, Japan

[73] Assignee: Canon Kabushiki Kaisha, Tokyo, Japan

[21] Appl. No.: 734,288

[22] Filed: May 15, 1985

[30] Foreign Application Priority Data

May 17, 1984 [JP] Japan ................................. 59-98957
May 17, 1984 [JP] Japan ................................. 59-98958
May 17, 1984 [JP] Japan ................................. 59-98959

[51] Int. Cl.$^4$ .............................................. G03B 3/10
[52] U.S. Cl. ................................................. 354/403
[58] Field of Search ................................ 354/400–409

[56] References Cited

U.S. PATENT DOCUMENTS

Re. 31,362 8/1983 Shenk ............................... 354/401 X

Primary Examiner—William B. Perkey
Attorney, Agent, or Firm—Toren, McGeady, Stanger, Goldberg & Kiel

[57] ABSTRACT

The disclosed automatic focusing device operates with cameras, or the like, in either a first mode in which a range finding operation and a lens drive operation occur alternately or in a second mode in which the lens is driven during the range finding operation. The mode is automatically selected depending on the conditions of an object to be photographed so as to optimize the focus adjustment for a given photographic situation.

6 Claims, 6 Drawing Figures

AUTOMATIC FOCUSING DEVICE

BACKGROUND OF THE INVENTION

1. Field of the Invention

This invention relates to an automatic focusing device for use in cameras.

2. Description of the Prior Art

Many devices of this kind have been proposed and are available commercially. In apparatuses using such devices, the range finding operation and the lens movement are performed either simultaneously or alternately. The former method introduces the likelihood of hunting when the environment is dim or when the radiation reflected from the object and impinging on a sensor of the range finder weak. Alternate range finding and lens movement causes a large difference in the speed of movement of the lens between the successive cycles of a drive operation. Thus, these methods have respective merits and demerits.

Some known devices respond to insufficient output from the range finder by causing the speed of movement of the lens to increase so that it takes but a short time to bring the lens into a range of positions for allowing the range finder to be responsive to the object. This shortens the time necessary to establish an in-focus condition. However, when the output of the range finder is sufficient, if there is a large discrepancy between the actual position of the lens and a position to which the lens must be moved to bring the object image into focus, it will take a long time to control the focusing adjustment on the basis of the accurate distance measurement. Therefore, it is desirable to drive the lens at a high speed even in this ease. However, because such prior known devices do not take the relationship between the lens start position and the object distance into account, the lens cannot be moved fast.

For the combination of a very far object and the lens start position set at a far object distance, consideration of the depth of field of the lens may make it unnecessary to move the lens to an accurate in-focus position, but merely requires focusing to the hyperfocal distance. However, even for such photographic situations, prior known devices cannot help but move the lens until the accurately adjusted position is reached. Therefore, the focusing operation takes a long time to complete.

SUMMARY OF THE INVENTION

An object of the invention is to provide a focusing device which operates with selection of either one of two modes, or the aforesaid intermittent drive in which the range finding and the driving of motion of the lens alternate with each other, and the aforesaid simultaneous drive, depending upon the output of a photosensitve element of a range finder, thus controlling the focusing adjustment in a manner suited to the given photographic situation.

Another object of the invention is to provide a focusing device in which when a position to which the lens must be moved is at a long distance from the position from which the lens starts, the lens is driven to move at a high speed, thereby the focusing time is shortened.

Still another object of the invention is to provide a focusing device in which for an object at a very far distance, as the photographic lens has already been focused on a far object distance, the lens is then moved to effect focusing to the hyperfocal distance, and prohibited from further or wasteful focusing movement, thereby the focusing time is shortened.

These and other objects of the invention will become apparent from the following description of an embodiment thereof with reference to the accompanying drawings.

DETAILED DESCRIPTION OF THE PREFERRED EMBODIMENTS

Figure 1:
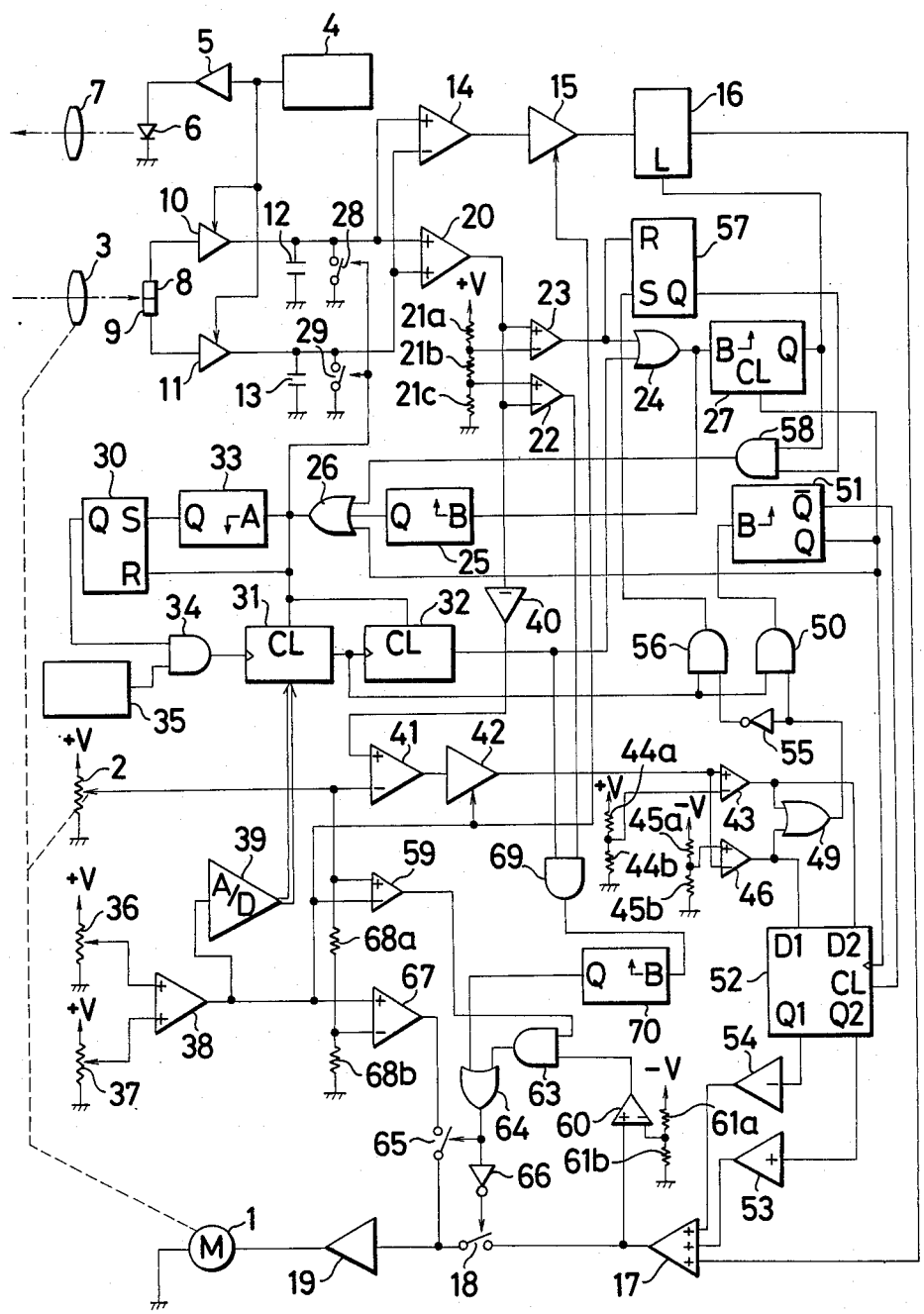
FIG. 1 is an electrical circuit diagram of an embodiment of an automatic focusing device according to the present invention.

FIG. 1 illustrates an automatic focusing ccircuit embodying the invention, each of the constituent elements of which is first described in numerical order below.

1: An electric motor for axially moving a photographic lens (not shown) to perform the focusing adjustment of the photographic lens to an object to be photographed.

2: A lens position detecting circuit constructed with a resistance track and a brush which moves along with the axial movement of the photographic lens. This detecting circuit 2 is arranged so that its output voltage increases when the photographic lens moves from one terminal end for the minimum object distance to the other for infinity.

3: A collection lens for directing the reflected light from the object to photosensitive elements 8 and 9 to be described later. This collection lens 3 is operatively connected by a known method with the axial movement of the photographic lens, and arranged so that when the photographic lens is sharply focused on the object, the reflection of the projected light from the object is incident on the photosensitive elements 8 and 9 at the boundary thereof.

4: A clock pulse generating circuit for producing a train of clock pulses.

5: An amplifier.

6: A light-emitting element receptive of the clock pulses amplified by the amplifier 5 for producing light in pulse form.

7: A projection lens for projecting a near infrared light from the light emitting element 6 into a target area.

8, 9: Photosensitive elements whose ratio of respective outputs varies with the amount of incident light. The collection lens 3 makes the output of the photosensitive elements 8 and 9 become almost equal when the photographic lens is in the in-focus condition.

10, 11: Synchronizing circuits which receive the clock pulses from the clock pulse signal generating circuit 4 for causing capacitors 12 and 13 to integrate only those of the outputs of the photosensitive elements 8 and 9 which occur when the light-emitting element 6 is giving off light.

12, 13: Capacitors

14: A difference amplifier for producing an output representing the difference between the integrated values of the capacitors 12 and 13.

15: A variable gain amplifier from amplifying the output of the difference amplifier 14 with the gain being variable. This output voltage offers focus detecting information representing near focus, in-focus, and far focus. That is, the output of this variable gain amplifier

15 is positive when in near focus, almost zero when in sharp focus, and becomes negative when in far focus. The variable gain amplifier 15 produces a high gain as a high accurate operation of distance measurement is required.

16: A latch circuit for latching the output of the difference amplifier 14 in a timing to be described later. This latch circuit is constructed with, for example a capacitor.

17: An adder.

18: An analog switch that turns on when the output of an inverter 66 is high level (hereinafter called "H" level).

19: An amplifier. Its output voltage controls the operation of the electric motor 1. That is, when this output is positive, the motor 1 rotates in a forward direction, moving the photographic lens toward the terminal end for an infinite distant object. When negative, the motor 1 rotates in the reverse direction, moving the photographic lens to the opposite terminal end. And when nearly zero, the motor 1 stops. Also, the speed of rotation of the motor 1 varies depending on the magnitude of the output voltage of the amplifier 19. As the degree of image sharpness increases, the speed of movement of the photographic lens decreases.

20: An adding amplifier for adding the integrated values of the condensers 12 and 13.

21a–21c: Voltage dividing resistors for determining reference levels for comparators 22 and 23 to be described later. A junction of the resitors 21a and 21b is connected to the inverting input of the comparator 23, and another junction of the resistors 21b and 21c at which appears a lower voltage than that at the junction of the resistors 21a and 21b is connected to a non-inverting input of the comparator 22.

22, 23: The comparators. The non-inverting input of the comparator 23 is connected to the output of the adding amplifier 20. Therefore, the outputs of the comparators 22 and 23 are L (low) and H (high) levels respectively when the output of the adding amplifier 20 is higher than the voltage level at the junction of the resistors 21a and 21b, are both L level when it lies between the voltage levels at the junction of the resistors 21a and 21b and the junction of the resistors 21b and 21c, and are H and L levels respectively when it is lower than the voltage level at the junction of the resistors 21b and 21c.

24: A 2-input OR gate.

25, 27: A monostable multivibrator whose Q output once takes H level when the output of the OR gate 24 inverts from L to H level.

26: A 3-input OR gate. Its one input is connected to the Q input of the monostable multivibrator 25.

28, 29: Analog switches that turn on when the output of the OR gate 26 becomes H level. When these switches 28 and 29 turn on, the capacitors 12 and 13 are reset, and the integration of the outputs of the synchronizing circuits 10 and 11 stops.

30: An SR flip-flop whose S input if connected to the Q output of a monostable multivibrator 33, and whose R input is connected to the output of the OR gate 26. Also, the flip-flop 30 is reset by the output of a power-up clear circuit (not shown) when a current supply to the entire circuit starts.

31, 32: Frequency dividing circuits. The frequency dividing circuit 31 changes its frequency dividing ratio depending on the output of the A/D converter 39. The frequency dividing circuits 21 and 32 are each reset when the output of the OR gate 26 becomes H level. The frequency dividing circuit 32 further divides the frequency of output of the frequency dividing circuit 31, and their outputs become H level in respective prescribed times.

33: A monostable multivibrator whose Q output once takes H level when the output of the OR gate 26 inverts from H to L level.

34: A 2-input AND gate for passing the clock pulses from a clock pulse generating circuit 35 to the frequency dividing circuit 31 therethrough when the Q output of the monostable multivibrator 30 is H level.

35: The clock pulse generating circuit.

36, 37: Variable voltage dividers. The variable voltage divider 36 produces an output of which the level is higher when the focal length of the photographic lens is longer, and the variable voltage divider 37 produces an output of which the level is higher when the aperture signal at the time of exposure nears the full open aperture.

38: An adding amplifier for adding the outputs of the variable voltage dividers to produce an output representing ½ of a hyperfocal distance signal.

39: To convert the analog output of the adding amplifier 38 to a digital signal.

40: An inverting amplifier for producing an output whole level is higher when the signal of the adding amplifier 20 is lower.

41: A difference amplifier whose non-inverting input is connected to the output of the inverting amplifier 40 and whose inverting input is connected to the output of the lens position detecting circuit 2.

42: A variable gain amplifier that changes its gain as a function of the output of the adding amplifier 38 and amplifying the output of the difference amplifier 41. The variable gain amplifier 42 produces a high gain as a high accurate operation of distance measurement is required.

43, 46: Comparators.

44a, 44b, 45a, 45b: Voltage dividing resistors.

49: A 2-input OR gate connected to the outputs of the comparators 43 and 46. Its output is connected through an AND gate 50 and inverter 55 to an AND gate 56.

50, 56: The 2-input AND gates. Their one inputs are connected to the output of the frequency dividing circuit 31.

51: A monostable multivibrator whose Q and $\overline{Q}$ outputs once take H and L levels respectively when the output of the AND gate 50 inverts from L to H level. Its Q output is connected to one of the inputs of the OR gate 26 and the "clear" terminal of the monostable multivibrator 27.

52: A D latch circuit whose D1 and D2 inputs are conencted to the outputs of the comparators 46 and 43 respectively. This D latch circuit 52 latches all the inputs D1 and D2 when the Q output of the monostable multivibrator 51 becomes H level, and is reset when the $\overline{Q}$ output becomes H level. Also its Q1 and Q2 outputs are connected through an amplifier 53 and an inverting amplifier 54 to the adder 17.

53: The amplifier.

54: The inverting amplifier.

55: The inverter.

57: An SR flip-flop whose R input is connected to the output of the comparator 23 and whose S input is connected to the output of an AND gate 56. Also, this flip-flop 57 is reset by the output of the power-up clear circuit (not shown) at the start of the current supply to the entire circuit.

58: A 2-input AND gate whose inputs are connected to the Q outputs of the SR flip-flops 57 and 27, and whose output is connected to one of the inputs of the OR gate 26.

59: A comparator for comparing the output of the adding amplifier 38 with the output of the lens position detecting circuit 2. The output of the position detecting circuit 2 is connected to the non-inverting input, and the output of the adding amplifier 38 is connected to the inverting input.

60: A comparator for comparing the output of the adder 17 with the voltage level determined by the voltage dividing resistors 61a and 61b. The output of the adder 17 is connected to the non-inverting input, and the junction of the resistors 61a and 61b is connected to the inverting input.

61a, 61b: The voltage dividing resistors.

63: A 2-input AND gate whose inputs are conected to the outputs of the comparators 59 and 60.

64: A 2-input OR gate. When the output of the AND gate 63 of a monostable multivibrator 70 is H level, its output becomes H level, thereby the analog switch 65 is turned on. Also, when its output is L level, the analog switch 18 is turned on through an inverter 66.

65: An analog switch.

66: The inverter.

67: A difference amplifier whose inverting input is connected to the output of a voltage divider of resistors 68a and 68b which is equal to a half of the output of the lens position detecting circuit 2, and whose non-inverting input is connected to the output of the adding amplifier 38. Its output is connected through the analog switch 65 to the amplifier 19.

68a, 68b: The voltage dividing resistors.

69: A 2-input AND gate.

70: A monostable multivibrator whose Q output once takes H level when the output of the AND gate 69 inverts from L to H level, as the outputs of the comparator 22 and the frequency dividing circuit 32 both become H level.

In the embodiment, when the object lies very far, the output level of the adding amplifier 20 is assumed to be lower than the potential at the junction of the resistors 21b and 21c even at a time when H level is sent as the output from the frequency dividing circuit 32. Also, when the object lies at a far distance, the output level of the adding amplifier 20 is assumed to be higher than the potential at the junction of the resistors 21b and 21c and lower than the potential at the junction of the resistors 21a and 21b even at a time when H level is sent as the output from the frequency dividing circuit 32. Also, when the object lies at a near distance, the output level of the adding amplifier 20 is assumed to become higher than the potential at the junction of the resistors 21a and 21b in a time interval from the moment at which H level has been sent as the output from the frequency dividing circuit 31 to the moment at which H level is sent as the output from the frequency dividing circuit 32. Also, when the object lies at the minimum distance, the output level of the adding amplifier 20 is assumed to become higher than the potential at the junction of the resistors 21a and 21b before H level is sent as the output from the frequency dividing circuit 31.

To outline the operation of the circuit of FIG. 1, the motor 1, the lens position detecting circuit 2 and the collection lens 3 are co-ordinated with each other, and the light-emitting element 6 is energized based on the output of the pulse generating circuit 4 through the amplifier 5. Light from the element 6 is projected into the target area, and its reflected light is received through the collection lens 3 on the photosensitive elements 8 and 9. Their outputs are processed based on the prescribed computation scheme to effect automatic focusing.

In more detail, the photo-electric outputs of the elements 8 and 9 are sampled by the synchronizing circuits 10 and 11 so that only the synchronized light with the pulses of the projected light is integrated by the capacitors 12 and 13. Their output difference is amplified by the difference amplifier 14 and the vairable gain amplifier 15. Its output is applied through the latching circuit 16, adder 17 and analog switch 18 to the amplifier 19 by which the motor 1 is energized. As the collection lens 3 moves along the photographic lens, when the outputs of the photosensitive elements 8 and 9 are in balance, the automatic focusing adjustment is formed.

A more detailed explanation of the operation of the circuit of FIG. 1 appears below. The following eight modes are selected depending on the object position and the photographic lens position. The figure numbers denote the corresponding timing charts to the respective modes.

Figure 2:
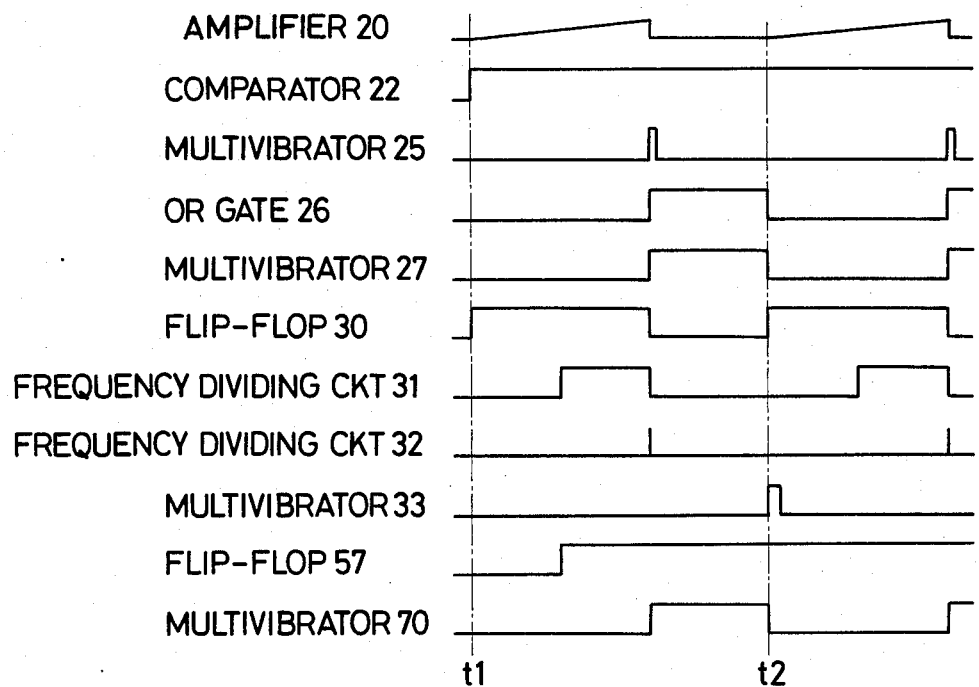
FIGS. 2 to 6 are pulse timing charts illustrating respective modes in which the device of FIG. 1 operates selectively.
Figure 3:
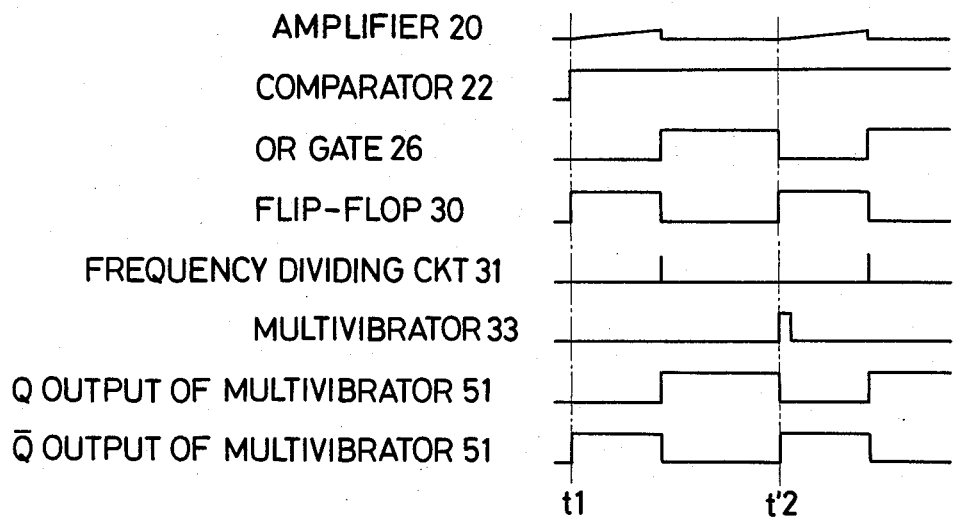
Figure 4:
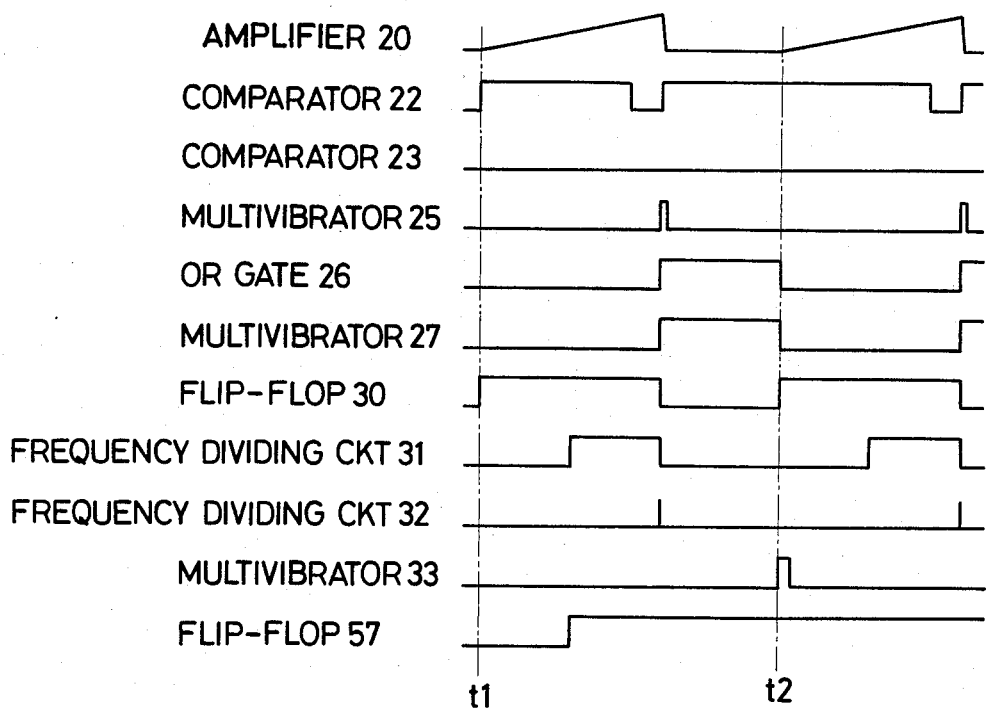
Figure 5:
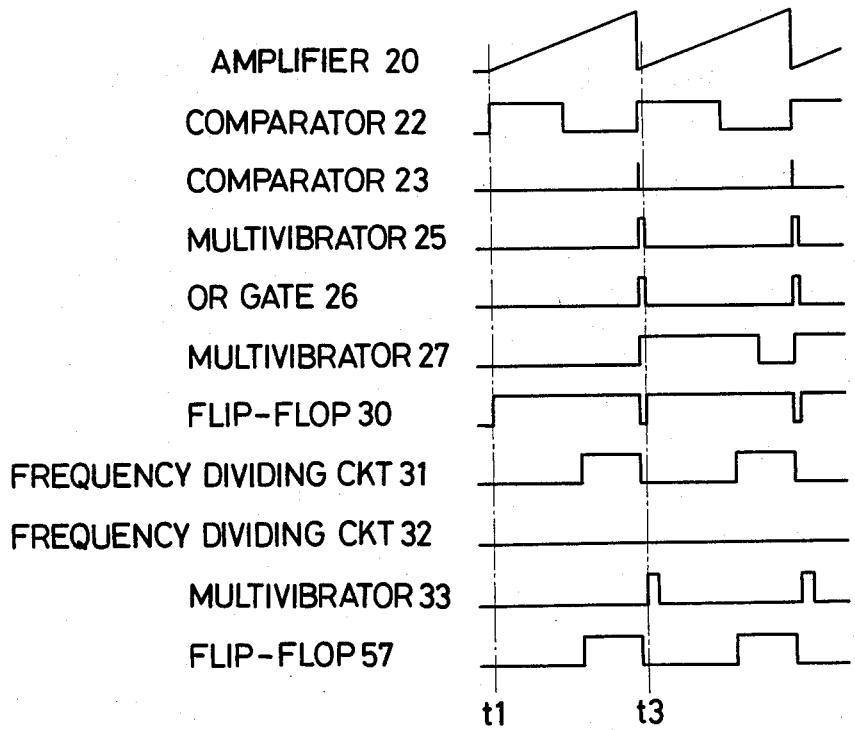
Figure 6:
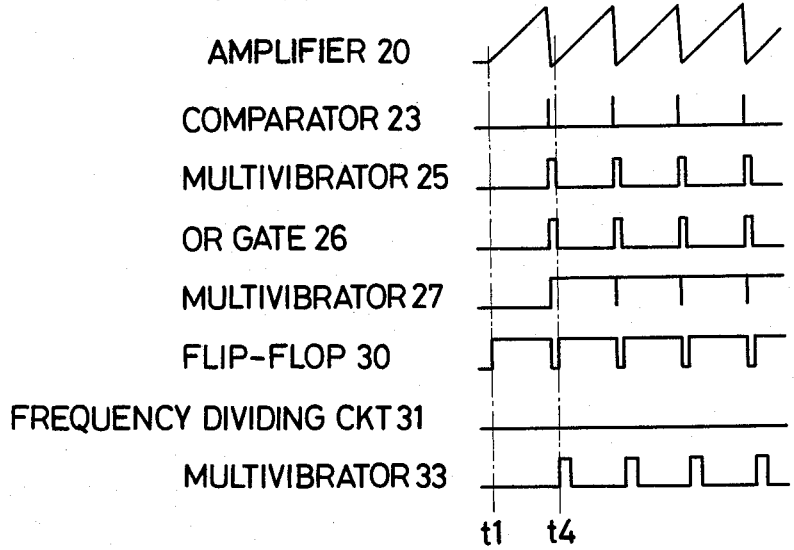

| Operation | Object Position | Lens Position | |
|---|---|---|---|
| Mode 1 | Very Far | Far side | FIG. 2 |
| Mode 2 | Very Far | Near Side | FIG. 3 |
| Mode 3 | Far | Far Side | FIG. 4 |
| Mode 4 | Far | Near Side | FIG. 3 |
| Mode 5 | Near | Far Side | FIG. 3 |
| Mode 6 | Near | Near Side | FIG. 5 |
| Mode 7 | Very Near | Far Side | FIG. 6 |
| Mode 8 | Very Near | Near Side | FIG. 6 |

In Mode 1, the photographic lens is focused to the hyperfocal distance. In Mode 2, Mode 4 and Mode 5, the photographic lens is driven to move at a high speed. In Mode 3, the control of the motor 1 and the range finding operation alternate with each other. In the case of Mode 6, Mode 7 and Mode 8, the simultaneous drive method is employed.

(1) Mode 1:

When an electrical power source is connected, the light-emitting element 6 starts to give off light intermittently in response to the pulses from the clock pulse generating circuit 4. Also, the set-reset flip-flop 30 is set and its Q output changes to H level at a time $t_1$ as shown in FIG. 2. Responsive to this, the AND gate 34 starts to pass the pulses from the clock pulse generating circuit 35 to the frequency dividing circuit 31 therethrough. When the number of pulses counted has reached a prescribed value, the output of the frequency dividing circuit 31 becomes H level as shown in FIG. 2 which is applied to the AND gates 50 and 56.

Because, in this mode, the lens is on the "Far" side, the output of the lens position detecting circuit 2 is large. Also because the object lies very far, the amount of light incident on the photosensitive elements 8 and 9 is small, the output of the adding amplifier 20 is small, and the output of the inverting amplifier 40 is large. Therefore, the two inputs of the difference amplifier 41 do not differ greatly from each other. Therefore, the output of the difference amplifier 41 is small, causing the comparators 43 and 46 to produce outputs of L level. The OR gate 49 then produces an output of L level, the inverter 55 then produces an output of H level, and the AND gate 56 then produces an output of H level. In a timing in which output of the frequency dividing circuit 31 changes to H level, therefore, the SR flip-flop 57 is set as shown in FIG. 2.

As to the comparator 22, because the output of the adding amplifier 20 is small below the voltage level at the junction of the resistors 21b and 21c, its output changes to H level at the time $t_1$. On the other hand, in a certain short time from the change of the output of the frequency dividing circuit 31 to H level, the output of the frequency dividing circuit 32 changes to H level, causing the output of the AND gate 69 to change to H level. The output of the monostable multivibrator 70 is then changed to and maintained at H level for a time until $t_2$ as shown in FIG. 2. By this output of the multivibrator 70, the output of the OR gate 64 is changed to H level, turning on the analog switch 65. On the other hand, as the output of the inverter 66 becomes L level, the analog switch 18 is turned off. Since, at this time, the difference amplifier 67 is supplied with the signal representive $\frac{1}{2}$ of the hyperfocal distance from the adding amplifier 38 and a signal representing $\frac{1}{2}$ of the magnitude of the output of the lens position detecting circuit 2 from the voltage divider of resistors 68a and 68b (because these resistors have the same resistance value), if these signals are not equal to each other in magnitude, the output of the difference amplifier 67 controls the driving of the motor 1 through the amplifier 19. As the photographic lens moves, when the output of the difference amplifier 67 becomes zero, or when the output of the lens position detecting circuit 2 coincides with the output of the adding amplifier 38, the motor 1 is stopped. Thus, the photographic lens is set at a positon with the focus at the hyperfocal distance.

(2) Mode 2, Mode 4 and Mode 5:

In Mode 2, for example, because the lens lies on "Near" side, the output of the lens position detecting circuit 2 is small. Therefore, the output of the difference amplifier 41 becomes large, causing the OR gate 49 to produce an output of H level. When the output of the frequency dividing circuit 31 changes to H level, the AND gate 50 is then gated on, thereby the Q and $\overline{Q}$ outputs of the monostable multivibrator 51 are changed to and maintained at H and L levels respectively for a time as shown in FIG. 3. By this Q output, the frequency dividing circuit 31 and the flip-flop 30 are reset. Also the D latch circuit 52 is latched by the Q output of the multivibrator 51 so that the output of H level from the comparator 43 is placed at the output Q2 of the latch circuit 52. Also because the frequency dividing circuit 31 is reset, the frequency dividing circuit 32 is inoperative. Therefore, the AND gate 69 continues producing the output of L level which holds the monostable multivibrator 70 inoperative. Also, as the comparator 59 compares the output of the lens position detecting circuit 2 with the output of the amplifier 38, when the lens is in a corresponding position to a longer distance than a half of the hyperfocal distance, the comparator 59 produces an output of H level. Also, the comparator 60 produces an output of H level when the output of the adder 17 has a large value of negative sign representing a long focusing movement in a direction to effect focusing down toward the minimum object distance, In Mode 2, therefore, the output of the AND gate 63 is held at L level.

Therefore, in this case, the output of the OR gate 64 becomes L level, which turns on the switch 18. Also, as has been described above, in this mode, the Q2 output of the latch circuit 52 is applied through the amplifier 53 to the adder 17 and therefrom further goes to the motor 1. The latch circuit 52 will be cleared when the $\overline{Q}$ output of the monostable multivibrator 51 returns to H level. It is in this mode that the motor 1 is energized only for the time determined by the multivibrator 52. Because the output of the latch circuit 52 is amplified by the amplifier 53, a large drive voltage is applied to the motor 1 to move the lens at a high speed.

It is also to be noted that during the time when the multivibrator 51 produces the Q output that is, when the motor 1 is being energized, the frequency dividing circuit 31 and the flip-flop 30 are reset, and the switches 29 and 28 are ON, and, therefore that the range finding operation is hindered from occurring when the motor 1 is rotating.

Even in Mode 4, the operation of the motor 1 is controlled in exactly the same manner as that described in connection with Mode 2. In mode 5, too, the operation of the motor 1 is controlled in an almost similar manner. That is, even in Mode 5, for the object at a near distance, the output of the adding circuit 20 cannot reach the prescribed value before the output of the frequency dividing circuit 31 becomes H level, and, therefore, the output of the comparator 23 cannot assume an H level. For this reason, in this case too, in a similar manner to Mode 2, as has been described above, the outputs of the comparators 43 and 46 are latched in the latch circuit 52, in accordance with the output of which is controlled the operation of the motor 1. In this case, the output of the amplifier circuit 41 is of negative level, so that the output of the comparator 46 is latched in the latch circuit 52, and its output is amplified to drive motion of the motor with a large voltage of negative level. This results in moving the lens at a high speed in a direction to effect focusing to shorter distances.

As has been described above, when the amount of light incident on the photosensitive elements is so low that the amount of light integrated does not reach the prescribed value within the counting period of the frequency dividing circuit 31, and when the start position of the lens is at a large distance to a position to which the lens must be moved, the level of potential applied to the motor is increased with increase in the speed of movement of the lens. Thus, a rough focusing adjustment is performed.

(3) Mode 3:

In this case, as the object lies at a far distance, similarly to Mode 2, the incident light level on the photosensitive elements 8 and 9 is so low that the output of the comparator 23 does not change to H level within the counting time of the frequency dividing circuit 31. On the other hand, the lens lies on "Far" side so that the output of the difference amplifier 41 is small, and both of the comparators 43 and 46 produce outputs of L level. Therefore, when the frequency dividing circuit 31 has completed its counting and changes its output to H level, instead of the gate 50 producing the output of H level as in Mode 2, the gate 56 produces an output of H level which is applied to set the flip-flop 57 as shown in FIG. 4, and to change its Q output to H level. Also, in this mode, as has been described above, because no H level is sent from the gate 50, the multivibrator 51 is inoperative, hindering the frequency dividing circuits 31 and 32 from being reset. Therefore, the frequency dividing circuit 31 continues counting pulses. Therefore, as in FIG. 4, after that, the output of the frequency dividing circuit 32 becomes H level, the output of the OR gate 24 becomes H level, and the output of the monostable multivibrator 27 becomes H level. Though, at the same time, the output of the multivibrator 25 also becomes H level, the multivibrator 27 holds H level for a longer time than the multivibrator 25 does, as shown in FIG. 4. The output of this multivibrator 27 latches the latch circuit 16 so that the operation of the motor 1 is controlled by the output of the variable gain amplifier 15, or a focus error signal. In other words, the difference amplifier 14 amplifies the difference signal of the outputs of the photosensitive elements 8 and 9 and produces an output which is positive for the near focus, negative for far focus and zero for in-focus. Therefore, based on the range finding result, the voltage indicating which direction the motor is to rotate in is applied to the motor 1. The lens is driven to move in that direction which is determined by that range finding result. At this time, this signal is applied directly to the adder without recourse to the amplifiers 53 and 54 as in Mode 2 so that the lens moves at a slower speed than when in Mode 2. Also, the output of the multivibrator 27 is applied through the AND gate 58 to the OR gate 26 and its output is changed to H level. Therefore, during the time when the output of the multivibrator 27 is of H level, the analog switches 28 and 29 are ON, thereby the capacitors 12 and 13 are discharged and the flip-flop 30 is reset. Thus, the range finding operation is prohibited. In this mode, therefore, the focusing operation by the motor 1 and the range finding operation are alternatively performed.

That is, as has been described above, after the motor 1 has rotated in a direction based on the result of the preceding range finding operation for the time determined by the multivibrator 27, the switches 28 and 29 turn off in response to change of the output of the multivibrator 27 (from H to L), and the frequency dividing circuits 31 and 32 and the flip-flop 30 are released from the resetting to perform the aforesaid range finding operation again.

When the object lies at a far distance, that output of the adding amplifier 20 which occurs after the counting time of the frequency dividing circuit 31 falls in between the potentials at the junction of the resistors 21a and 21b and at the junction of the resistors 21b and 21c, and the outputs of the comparators 22 and 23 are both of L level. Therefore, in this mode, despite H level being sent from the frequency dividing circuit 32, that the output of the AND gate 69 does not assume an H level, and that the lens is moved to the position for the hyperfocal distance as in the aforesaid mode.

(4) Mode 6, Mode 7 and Mode 8:

In Mode 6, because the object lies at a near distance, as shown in FIG. 5, the output of the adding amplifier 20 does not reach the prescribed value at the time point when the output of the frequency dividing circuit 31 becomes H level and the comparator 23 does not become H level. But, until the time point when the output of the frequency dividing circuit 32 becomes H level, the output of the adding amplifier 20 reaches the prescribed value. Therefore, the output of the comparator 23 becomes H level. In Mode 6, where the object lies at a near distance and the lens lies on "Near" side, the output of the amplifier 41 is small and the comparators 43 and 46 both produce the outputs of L level. Therefore, when the output of the frequency dividing circuit 31 becomes H level, the flip-flop 57 is set through the AND gate 56. And, in this mode, as has been described above, just before a time point $t_3$ at which the output of the frequency dividing circuit 32 changes to H level, the output of the cmparator 23 becomes H level. Therefore, this flip-flop 57 is reset by the output of the comparator 23. Also, the output of H level from the comparator 23 is applied through the OR gate 24 to change the output of the multivibrator 27 to H level, thereby the latch circuit 16 is latched. Therefore, by the output of the variable gain amplifier 15, that is, based on the range finding result, the motor 1 is driven. Also, the output of the OR gate 24 is applied even to the multivibrator 25. The output of the multivibrator 25 is then changed to and maintained at H level for a short time. As has been described above, at this time point, the multivibrator 27 produces H level, but because the flip-flop 57 is reset in synchronism with H level of the vibrator 27 as has been described above, the output of the vibrator 25 is applied to the OR gate 26, thereby the analog switches 28 and 29 are instantaneously turned on to suddenly discharge the capacitors 12 and 13. Soon after that, the switches 27 and 28 are turned off. Therefore, the condensers 12 and 13 soon start to be charged that is, the next range finding operation is soon initiated. Thus, in this mode, the focusing operation by the motor 1 through the latch circuit 16 and the range finding operation are carried out at the same time, or the simultaneous drive mode takes place.

For note, in the case of Mode 7 and Mode 8, because the object lies at a very near distance, as shown in FIG. 6, the ramp of the output of the adding amplifier 20 is large so that before the frequency dividing circuit 31 produces the output of H level, the comparator 23 produces the output of H level. Therefore, the time $t_4$ of one cycle becomes smaller than the similar time $t_3$ of FIG. 5. In this mode, therefore, the range finding cycle becomes only shorter than in FIG. 5 (Mode 6). The other operations are similar to those of Mode 5. That is, the simultaneous drive mode takes place.

As has been described above, when the amount of light received by the photosensitive elements 8 and 9 becomes higher than a certain level within a prescribed time, the simultaneous mode is selected, and when below the level, the alternating mode is selected.

Therefore, the lens drive error or hunting resulting from the employment of the simultaneous drive mode with the low reflected light amount can be prevented, and the problems of drive unevenness and increase of the moving time of the lens to the in-focus position resulting from the employment of the alternating mode with the high reflected light can be eliminated. Also, when the lens position and the object position are in large discrepancy, the lens is moved at the high speed roughly in a direction to the object position, it is possible to move the lens at the high speed to the in-focus position.

Also, when the object position lies very far and when the lens position lies far, the lens is forced to move to the hyperfocal position. In the above-mentioned case, the wasteful focusing operation is prohibited and rapid focusing occurs.

Also, the treatment of the embodiment is done almost by analog means, but it is needless to say that it may otherwise be done by software with the use of A/D converters and microprocessors.

What is claimed is:

1. A focusing device comprising:
   (a) a focus detecting circuit including a light receiving portion;

(b) a drive circuit for driving movement of a lens based on the output of said focus detecting circuit;

(c) a control circuit having a first mode in which a focus detecting operation by said focus detecting circuit and a lens drive operation by said drive circuit are alternatively performed, and a second mode in which the lens drive operation is carried out during the focus detecting operation; and (d) a selecting circuit for selecting the modes of said control circuit in response to a processing signal based on the output of the light receiving portion by said focus detecting circuit.

2. A focusing device according to claim 1, wherein said focus detecting circuit includes a first detecting portion for detecting the difference to the in-focus point based on the output of the light receiving portion and a second detecting portion for detecting the brightness level of the incident light on the light receiving portion based on the output of the light receiving portion, and said selecting circuit determines the mode of said control circuit in response to the output of said second detecting portion.

3. A device according to claim 1, wherein said second detecting portion dectects the integrated value of a light signal based on the light incident on the light receiving portion within a prescribed time and performs brightness level detection in response to its integrated value level.

4. A focusing device comprising:

(a) a first signal forming circuit for forming a signal representing the object position;

(b) a second signal forming cirucit for forming a signal representing the position of a lens; and (c) a control circuit for moving the photographic lens to the hyperfocal position when the signals from said first and said second signal forming circuits show a prescribed relationship.

5. A focusing device for a lens comprising:

(a) a sensor for sensing an image;

(b) a control circuit responsive to the output of the sensor for detecting a drive direction along which the lens is focused and driving the lens along the detected direction so as to focus the lens;

(c) a first signal forming circuit for producing a signal corresponding to the object position according to the output of the sensor;

(d) a second signal forming circuit for producing a signal according to the lens position;

(e) a signal source for producing a drive signal for driving the lens a certain predetermined amount; and (f) a change-over circuit for transferring the driving signal from the signal source to the control circuit so as to drive the lens a predetermined amount according to the signals from the first and second signal forming circuits when the distance between the lens position and the object position is larger than a given amount and transfers the output of the sensor to the control circuit so as to drive the lens for focusing when the distance is smaller than the given amount.

6. A device according to claim 5, wherein the control circuit includes a speed control portion for driving the lens at a speed higher than that according to the output of the sensor when the lens is driven according to the drive signal from the signal source.

* * * * *